United States Patent [19]

Bartholomew

[11] Patent Number: 4,804,020

[45] Date of Patent: Feb. 14, 1989

[54] CONDUIT LINER ASSEMBLY AND METHOD FOR INSTALLATION

[75] Inventor: Donald D. Bartholomew, Marine City, Mich.

[73] Assignee: Proprietary Technology, Inc., Mt. Clemens, Mich.

[21] Appl. No.: 54,777

[22] Filed: May 27, 1987

[51] Int. Cl.$^4$ ............................ G02B 6/44; F16L 9/18
[52] U.S. Cl. .................................. 138/111; 138/112; 138/114; 350/96.23
[58] Field of Search ............... 138/38, 111, 112, 114; 350/96.23

[56] References Cited

U.S. PATENT DOCUMENTS

| | | | |
|---|---|---|---|
| 3,357,455 | 12/1967 | Plummer | 138/111 X |
| 4,036,617 | 7/1977 | Leonard et al. | 138/112 X |
| 4,046,408 | 9/1977 | Ausnit | 138/111 X |
| 4,244,542 | 1/1981 | Mathews | 138/112 X |
| 4,456,058 | 6/1984 | Powell | 138/114 X |
| 4,529,009 | 7/1985 | Horner et al. | 138/114 X |
| 4,585,034 | 4/1986 | Hubbard et al. | 138/111 |
| 4,653,541 | 3/1987 | Oehlschlaeger et al. | 138/111 X |
| 4,687,294 | 8/1987 | Angeles | 350/96.23 |
| 4,688,890 | 8/1987 | DeMeo et al. | 138/111 X |

*Primary Examiner*—Stephen Marcus
*Attorney, Agent, or Firm*—Harness, Dickey & Pierce

[57] ABSTRACT

A conduit liner assembly for use in the installation of a series of fiber optics cables in an existing conduit. The conduit liner assembly includes a plurality of individual chambered inserts each having a central chamber and connected one to another in bundled engagement such that each of the inserts is longitudinally moveable individually with respect to each of the inserts adjacent thereto. Also provided is a method for installation of a conduit liner assembly in an existing conduit including the steps of connecting a group of separate tubular inserts together into a loosely held bundle wherein the separate tubular inserts are longitudinally moveable with respect to one another when connected. The bundle of inserts is next pulled through an existing conduit at a suitable access point in the conduit. The bundle is separated at the access point into separate tubular inserts. A pulling force is the applied to each of the separate tubular inserts. And the assembly is pulled through the conduit by applying the pulling force to each separate insert.

20 Claims, 6 Drawing Sheets

CONDUIT LINER ASSEMBLY AND METHOD FOR INSTALLATION

TECHNICAL FIELD

The subject invention relates to a conduit liner of the type used for housing a series of fiber optics elements or cables in an existing conduit.

BACKGROUND

The telephone and communications industry in the past has generally used electrical wires and cable installations in the transmission of telephone and other communications signals from one point to another. Due to the recent improvements in fiber optics technologies in the communications area, it has become economical and advantageous to use fiber optics elements to transmit telephone and other communications signals from one point to another. With the present fiber optics technology a fiber optics cable or element which is approximately the same size as a conventional wire element has the capacity to transmit many times the amount of information as the conventional wire element. Thus, the replacing of the conventional wiring system with fiber optics bundles of approximately the same size could greatly increase the capacity of the present communications system while utilizing the installation routes already in place.

It has been a recent goal of those in the art to utilize the fixtures, which are already in place in the existing communications systems, for replacement with fiber optics cables as the present communication lines reach their capacity.

At the present time there exists a system of underground conduits through which the conventional communication cables are routed to create the communication system presently in use. It is particularly desirable in these applications when substituting the conventional communication cables with the fiber optics elements or cables to use the existing conduits rather than attempting to replace the conduits, since replacement would be costly and require destructive excavations of roadway surfaces. Due to the increased capacity and decreased size of the fiber optic elements or cables it is desirable to place as many fiber optics elements or cables in a particular conduit as is possible. Thus the value of a particular conduit is directly related to the number of the fiber optics elements or cables which can be placed in a particular conduit.

Because of the nature of fiber optics cables in their use in the communications industry it is desirable to isolate particular bundles of fiber optics elements into discreet and independent chambers inside of an existing conduit. It is desirable to produce a configuration of a conduit liner which can be inserted into the existing conduit and would contain a series of discreet and independent chambers into which fiber optics elements could be inserted. Therefore a conduit liner which provides the greatest number of usable chambers in a particular conduit maximizes the value of the conduit regarding a fiber optics installation.

Attempts have been made to provide such inserts. However, it has been found that the use of an insert which has a series of integrally formed chambers creates problems in that the underground conduits used may have several curvatures or bends that must be traversed by such an insert. In the inserts of the past, the chambers have been made somewhat larger than the size of the fiber optics bundles desired to be inserted therein because while traversing these bends in the conduit the chambers have a tendency to become distorted and/or compressed to an out of round condition because of routing around these curves or bends in the conduit. In addition, the necessity for traversing these curves makes it harder to insert the liner into the existing conduit because of the forces required to distort the liner and the increased frictional forces between the liner and the conduit surfaces particularly at curvatures or bends in the conduit.

Because of these problems the liners of the past required an abnormally large space for the internal chambers which resulted in a decrease in the number of chambers which could be used for fiber optics cables in a particular conduit installation. In addition, the frictional engagement of the conduit walls and the distortion in liners of the past, even though relatively flexible materials were used, decreased the distance that a particular liner could be pulled through a conduit thereby requiring a greater number of splices in the liner and requiring more man hours and an increased number of access points for pulling a particular liner through an existing conduit, or alternatively the use of thicker walls of the liner tubes was required which reduces the number of tubes which may be pulled into a given conduit.

SUMMARY OF THE INVENTION

According to the present invention there is provided a conduit liner assembly which can be easily inserted into an existing conduit for retaining a plurality of fiber optics cables in discreet and separate chambers in the existing conduit. The conduit liner assembly includes a plurality of individual chambered inserts each of which include a central chamber. The inserts are adapted to be inter-connectedly secured one to another for providing the conduit liner assembly of the present invention. The inserts of the present invention are longitudinally moveable individually with respect to each of the adjacent inserts thereto.

The conduit liner assembly of the present invention allows the bending forces, and hence the frictional forces to be reduced to the sum of the bending forces of the plurality of individual chambered inserts used having smaller lighter wall constructions rather than requiring the excessive bending forces and subsequent higher frictional forces of a much larger diameter single tube that is reinforced by internal partitions which significantly increases the stiffness of such a larger diameter tube. Thus the sum of the frictional forces of the plurality of inserts of the present invention is much smaller than that of a singular larger diameter tube. In addition, the conduit liner assembly of the present invention wherein a plurality of chambered inserts are held in bundled engagement and are longitudinally moveable one to another the inserts act to reinforce and support one another thereby reducing the distortion of the individual inserts.

It is an object of the present invention to provide a conduit liner assembly which solves the problems of past conduit liners.

It is a further object of the present invention to provide a conduit liner assembly wherein a plurality of individual chambered inserts which are longitudinally moveable with respect to one another are provided for ease of insertion into an existing conduit and which allow the individual chambered inserts to slide longitudinally relative to one another particularly when traversing curves in an existing conduit creating less ovality in the chambers and thereby allowing an increase in the number of chambers through which fiber optics cables may be inserted in a given installation.

It is still further an object of the present invention to increase the value of an existing conduit when installing fiber optics replacement systems by providing an improved conduit liner assembly wherein a greater number of individual chambers are provided in the existing conduit through which fiber ptics elements or cables can be inserted.

It is still further an object of the present invention to provide a conduit liner assembly which can be routed through an existing conduit for a greater distance than those of presently available liners.

It is a further object of the present invention to provide a conduit liner assembly in which the individual chambered inserts can be separated and attached to individual capstans or other type of device for distributing the pulling forces between each of the individual inserts at points along the total path, then reconnecting them and thereby providing for the ability to pull the conduit liner a greater distance through the conduit.

BRIEF DESCRIPTION OF THE DRAWINGS

Additional objects and advantages of the present invention will become apparent by reading the detailed description of the preferred emboiment which makes reference to the following set of drawings, wherein.

DESCRIPTION OF THE PREFERRED EMBODIMENTS

Figure 1:
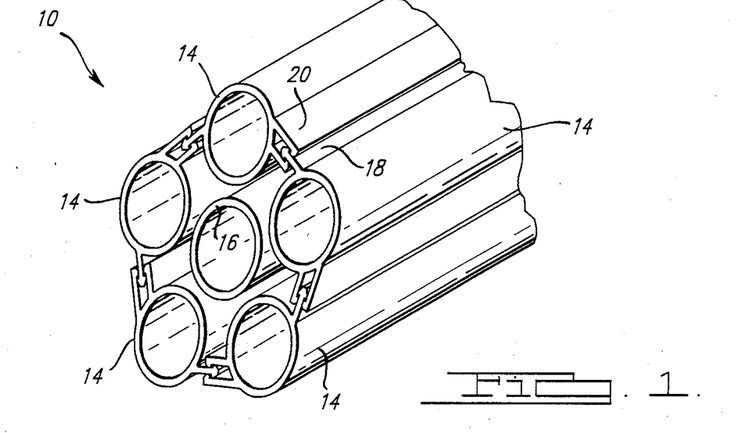
FIG. 1 is a perspective view partially broken away showing the conduit liner assembly of the present invention.
Figure 2:
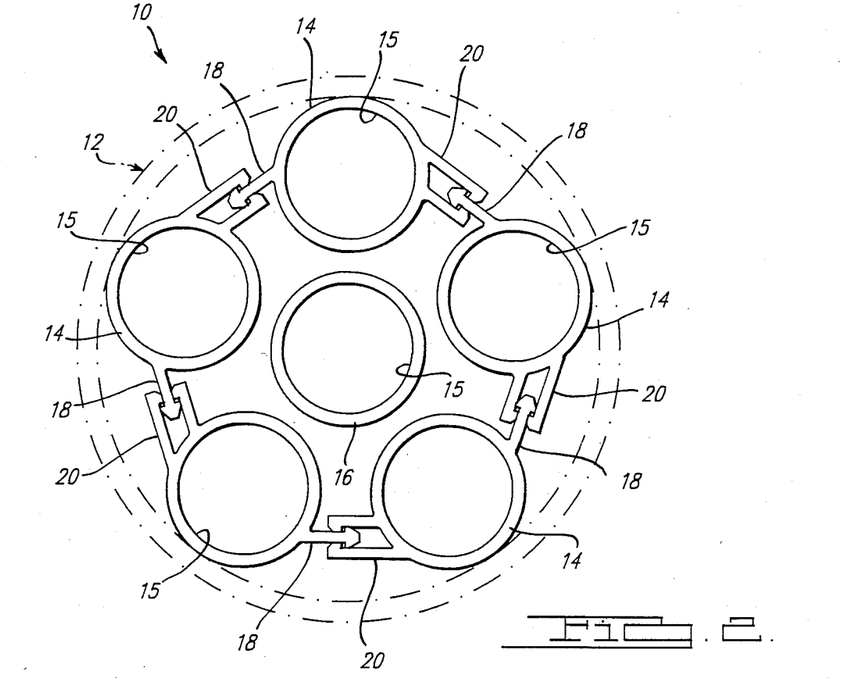
FIG. 2 is a sectional view partially in phantom of the conduit liner assembly shown in FIG. 1.

Referring now to the drawings and particularly to FIGS. 1 and 2 there is provided a conduit liner assembly, generally shown at 10, adapted to be inserted into an existing conduit, generally indicated at 12, for providing a plurality of separate and discreet chambers in the conduit 12 through which fiber optic elements or cables can be inserted for keeping the fiber optics cables in separate and discreet chambers in an existing conduit 12. The conduit liner assembly 10 includes a plurality of individual chambered inserts 14 each having a central chamber 15. The inserts 14 are adapted to be inter-connectedly secured one to another for providing the conduit liner assembly of the present invention wherein each of the inserts 14 is longitudinally moveable individually with respect to each of the inserts adjacent thereto.

In a preferred embodiment of the invention the conduit liner assembly includes an outer periphery of the inserts 14 which surround a central chambered insert 16 which is unconnected to the outer periphery of inserts 14. The outer periphery of inserts 14 are connected by male 18 and female 20 connection portions. The outer periphery of inserts 14 surround the central chambered insert 16 entrapping the central chambered insert 16. A conduit liner assembly 10 is provided in which each of the inserts 14 are longitudinally moveable between one another and are also radilly held in bundled engagement, wherein the central chambered insert 16 is longitudinally moveable with respect to each of the surrounding outer periphery of inserts 14.

Figure 2A:
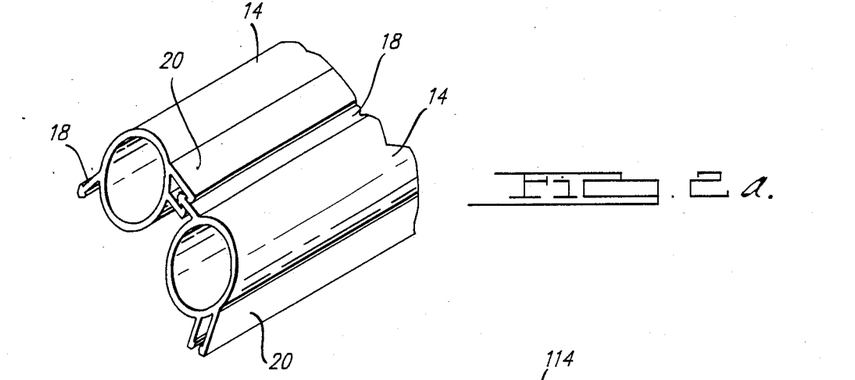
FIG. 2a is a detailed perspective view of the male and female connection portions of the conduit liner assembly shown in FIG. 1.

Referring now to FIG. 2a, each of the outer periphery of inter-connected inserts 14 includes a male connection portion 18 and a female connection portion 20 which extend axially along the full length of the insert 14. Thus, in the assembled condition an outer periphery of inserts 14 are produced whereby a male connection portion 18 of each of the inserts 14 connects with a female connection portion 20 of an adjacent insert and produces an inter-connected ring of the inserts 14 for surrounding the central insert 16.

In a preferred embodiment of the invention the inserts 14 are produced of a flexible material and are generally tubular in shape. However, other cross-sectional shapes could be used without deviating from the scope of the present invention. The central inserts 16 may either be of the same diameter as inserts 14 or in an alternate embodiment of the invention the central insert 16 can be produced with a larger diameter. This may be necessary in a particular application where the existence of several curves or bends in the conduit would cause the chamber to become more oval than is desired.

Figure 8:
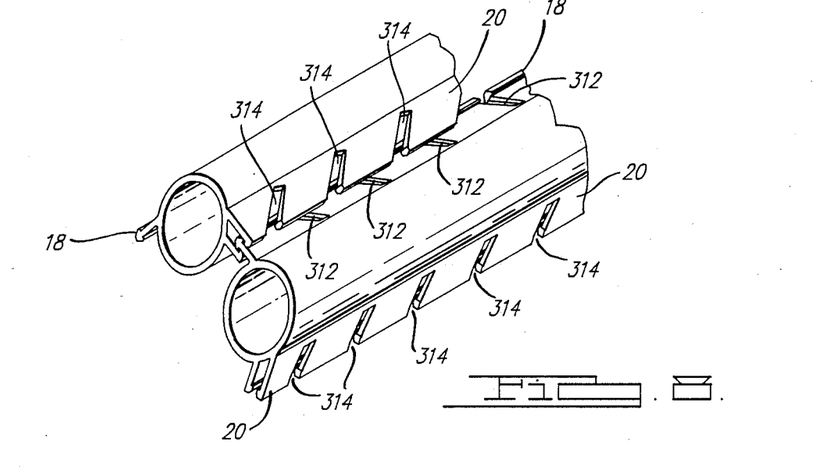
FIG. 8 is a perspective view partially broken away showing an alternate embodiment of the slotted connection portions in an alternate embodiment of the present invention.
Figure 9:
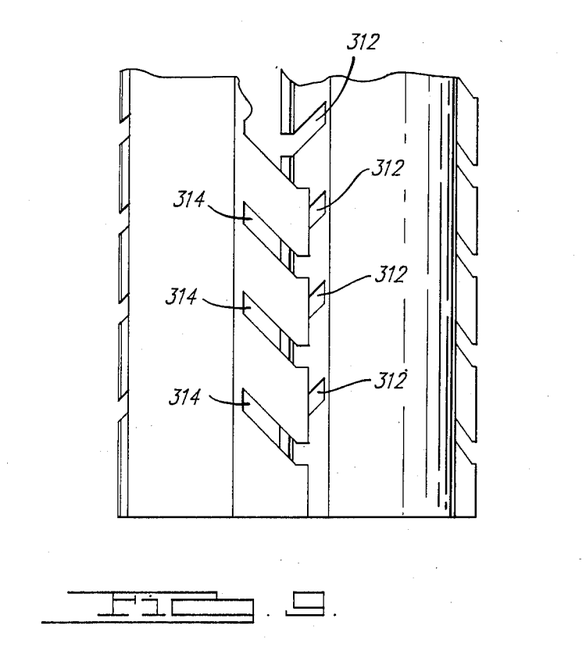
FIG. 9 is a top view of the embodiment shown in FIG. 8.

Referring now to FIGS. 8 and 9, in an alternate embodiment of the invention, the male connecting portion 18 includes a first series of outwardly extending slots, generally indicated at 312, along the length thereof. The female connecting portion 20 has a second series of outwardly extending slots 314 which are spaced along the respective female connection portion 20 along the axial length of the insert 14. Preferably the first 312 and second 314 series of slots are staggered from one another whereby the longitudinal movement between the tubes will not allow the slots to align which might create possible problems with hang-ups at the slots.

In the preferred embodiment of the invention slots 312 and 314 are disposed at an angle other than 90° and the angles of the first 312 and second 314 series of slots are opposite to one another such that the male portion 18 and the female portions 20 are never out of engagement frpom one another and thereby reducing the possibility of hang-ups on the connection portions during longitudinal movement between the inserts 14. The embodiment as shown in FIGS. 8 and 9 reduces the tension or compressive forces acting on the inserts when curvatures in the conduit are encountered during insertion of the assembly in the conduit. Thus flexibility of the individual inserts is enhanced by this slotting. This allows the conduit liner assembly of the present invention to resist the tendency of the inserts to go to an oval type of configuration as a result of compression forces developed in male 18 and female 20 portions during the routing of the assembly through the conduit.

Figure 3:
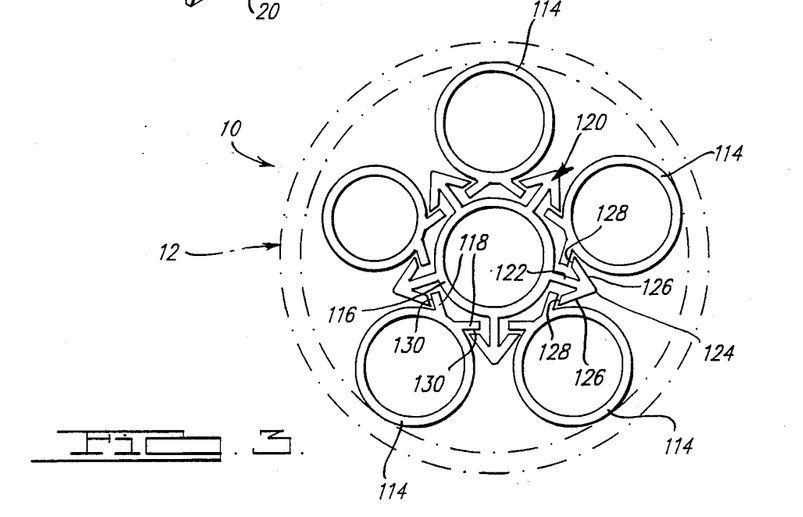
FIG. 3 is an alternate embodiment of the conduit liner assembly of the present invention.
Figure 3A:
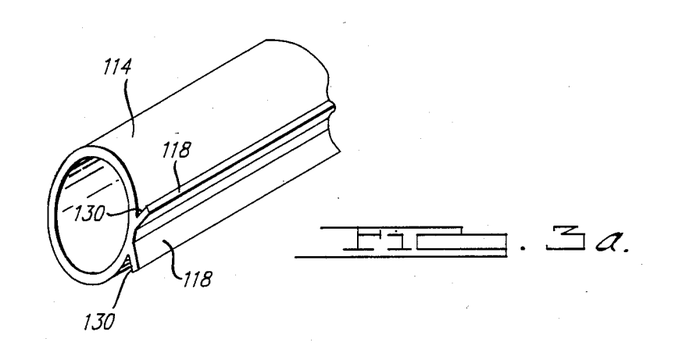
FIG. 3a is a detailed perspective view of the outer insert of the embodiments shown in FIG. 3.
Figures 3B, 4:
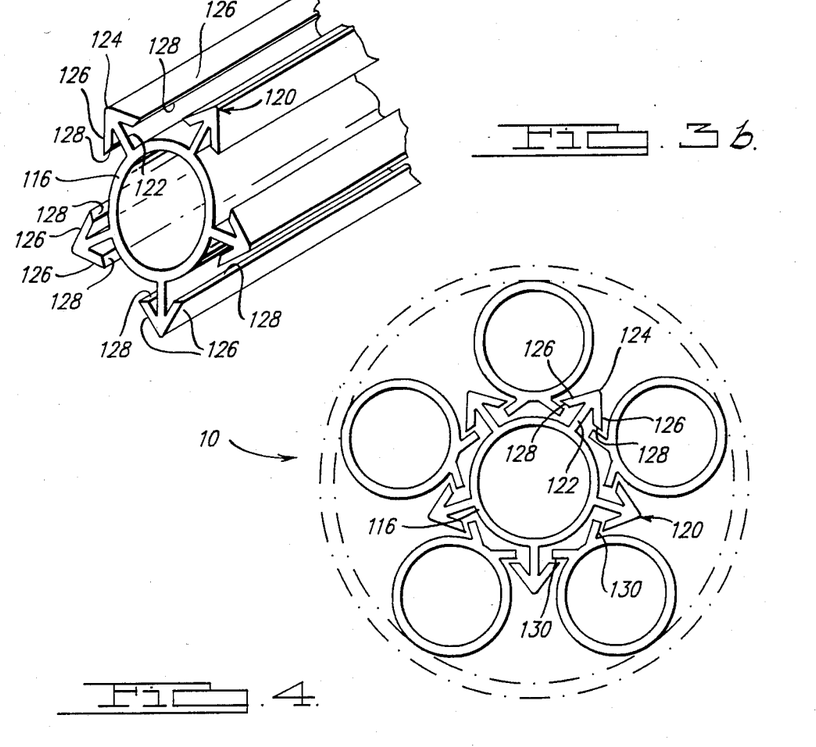
FIG. 3b is a detailed perspective view of the central insert of the embodiment shown in FIG. 3.
FIG. 4 is a alternate embodiment of the conduit liner assembly of the present invention.

Referring now to FIGS. 3, 3a and 3b there is provided an alternate embodiment of the conduit liner assembly of the present invention. As shown in FIG. 3 the conduit liner assembly 10 of this embodiment includes a central chambered insert 116 which has a plurality of radially extending retention protrusions 120 extending from the exterior of insert 116. This embodiment includes a plurality of outer chambered inserts 114 having cooperating retention portions 118. The cooperating retention portions 118 act in cooperation with the retention protrusions 120 for providing longitudinally slidable connection between the other chambered inserts 114 and the central insert 116.

Referring now to FIGS. 3a and 3b, the plurality of the retention portions 120 are male protrusions which extend along the axial length of insert 116. Each of the protrusions 120 has a central axial rib 122 having a peripheral edge 124. The protrusions 120 include a pair of locking edges 126 each having a free end portion 128 which is axially inward of the peripheral edge 124. The cooperating retention portions 118 include a pair of cordal edge portions 130 extending outwardly from the outer chambered inserts 114 along a line of a cord of the chamber of insert 114. The cordal edge portion 130 provides for cooperating retention with the ends 128 of the protrusion 120 for providing a longitudinally slidable engagement between the outer chambered insert 114 and the inner chambered insert 116. Also, the cooperation between retention portions 118 and protrusions 120 of the outer chambered insert provides a bundled arrangement which prevents radially outward movement between the central chambered insert 116 and the outer chambered inserts 114 beyond a predetermined limit. Additionally the protrusions 120 and cooperating retention portions 118 could alternatively be slotted in a manner similar to FIGS. 9 and 10 thereby conferring a similar beneficial result as before described in reducing the tendency for the tubes to become oval.

As shown in FIG. 4, if desired in a particular application the diameter of the inner chamber insert 116 can be greater than the diameter of the outer chambered inserts 114 to allow passage of a larger fiber optic cable. If desired and consistent with the teachings herein any of the inserts may be varied in size to facilitate particular desirable applications, of course corresponding compensations in the other inserts would also have to be made.

Figure 5:
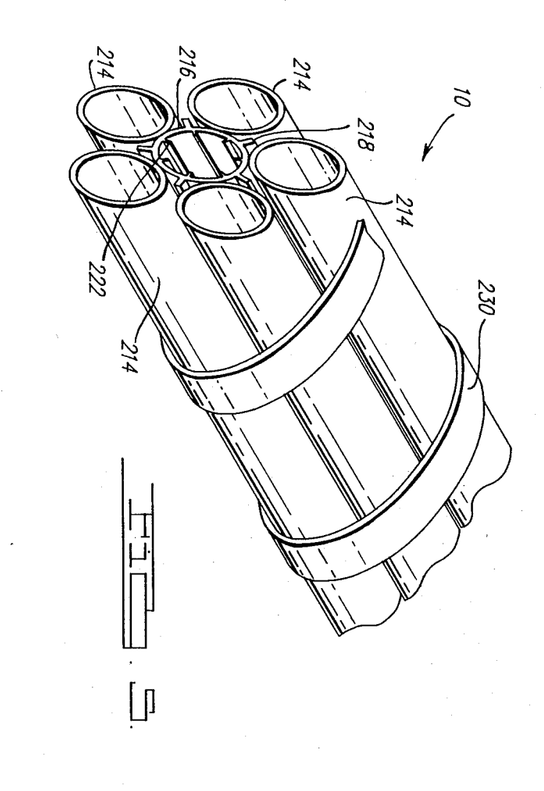
FIG. 5 is a perspective view of the alternate embodiment of the conduit liner assembly of the present invention.
Figure 6:
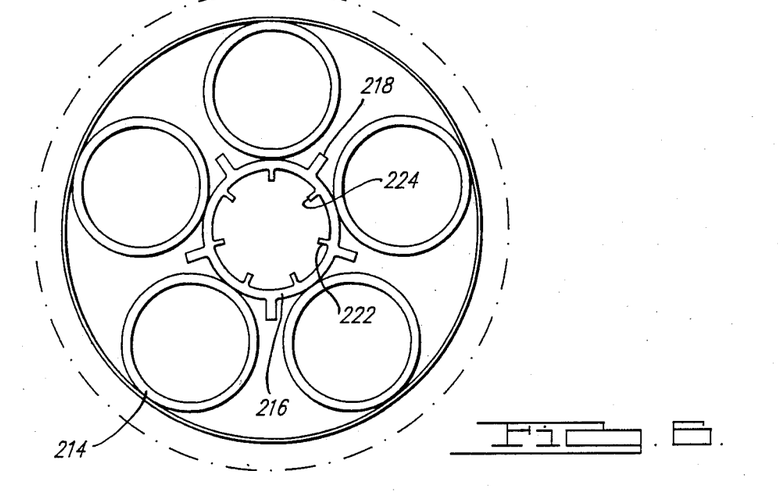
FIG. 6 is a cross sectional view of the embodiment shown in FIG. 5.
Figure 7:
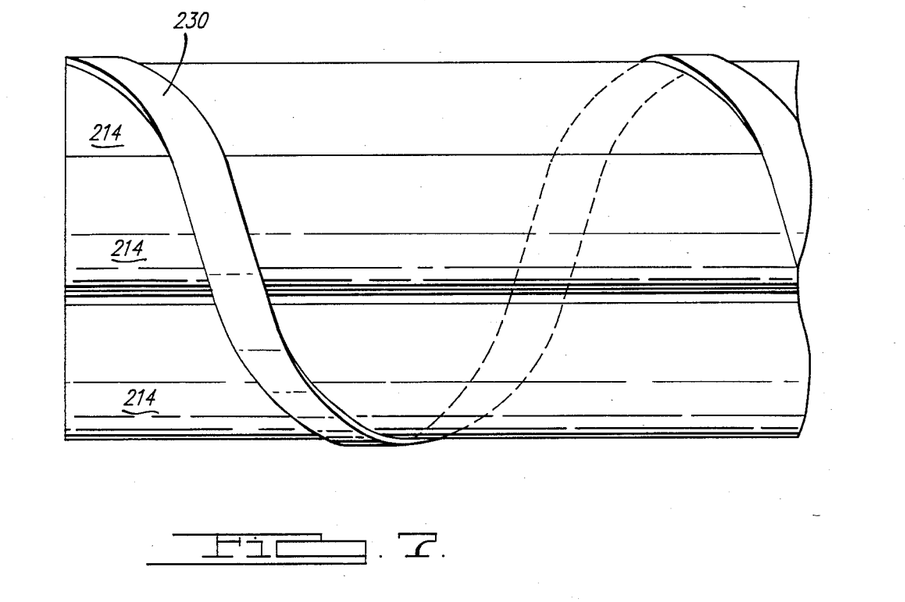
FIG. 7 is a plan view of the embodiment shown in FIG. 5.

Referring now to FIGS. 5 thru 7, in an alternate embodiment of the invention the inserts are held in bundled engagement by a flexible wrapping strap 230. As shown in FIG. 7, the inner chambered insert 216 includes a series of axially extending rib portions 218 along the length thereof. The ribs 218 act to retain the outer periphery of inserts 214 in generally symmetrically circumferential relationship around the inner insert 216.

Also provided are radially inwardly extending ribs 222 which include bearing surfaces 224 extending axially along the length of the chamber of the inserts 214 and 216. The bearing surfaces 224 advantageously act to reduce the friction between the insert chamber and the fiber optics strand or cable during the insertion of the fiber optics cable into the chamber. While the use of ribs 222 are shown in a particular embodiment of the invention they may be advantageously used in any of the embodiments disclosed herein.

Figure 10:
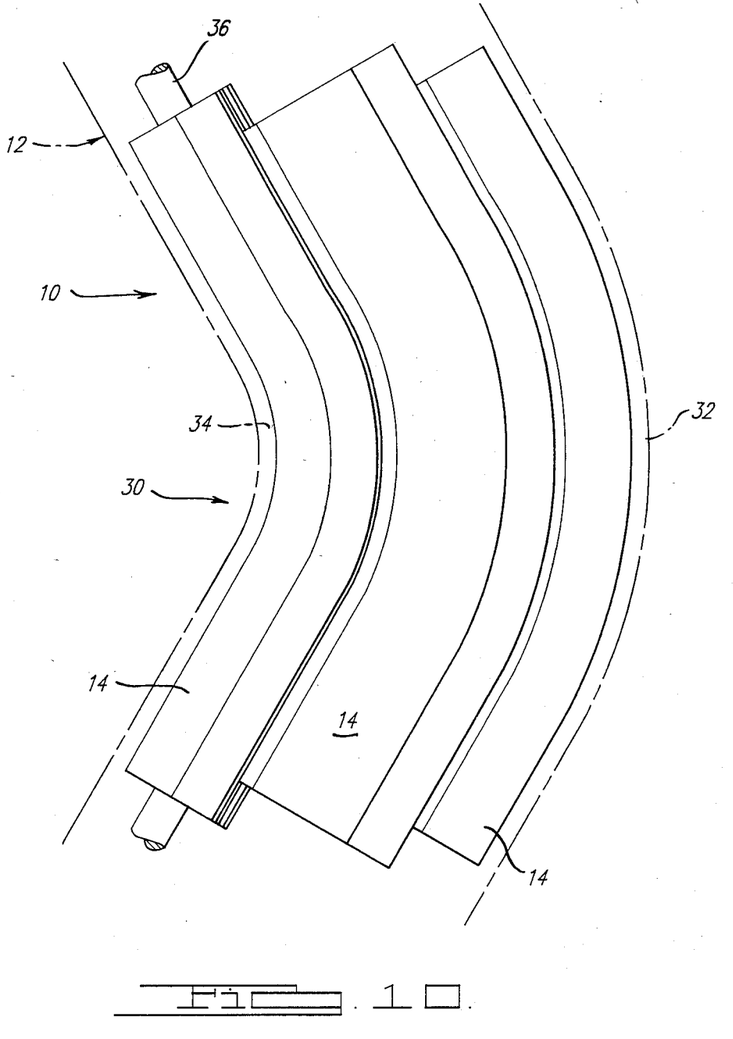
FIG. 10 is a view illustrating the conduit liner assembly traversing a curve in a conduit.

Referring now to FIG. 10, there is shown an illustration of a segment of the conduit liner assembly 10 of the present invention being routed through a curve 30 in a conduit 12. The conduit liner assembly of the present invention allows each of the separate inserts to act independently of one another when the conduit liner assembly is routed through conduit 12. More particularly, when the conduit liner assembly 10 is routed through curve 30 in conduit 12 the individual inserts 14, 16 can slide longitudinal independently of one another such that each individual insert traverses the curve 30 independently along its own path. This allows the inserts generally at the outer portion 32 of the curve 30 to go around the curve at generally a larger radius than those inserts at the inside 34 of the curve 30 which will traverse the curve along a smaller radius. The conduit liner assembly remains connected together in a bundled arrangement throughout this process. Because the individual liners can move independently of each other the forces between the individual inserts which would tend to disform or cause ovality in the tubes are lessened. This reduces the measures needed to compensate for potential ovality of the chambers, such as increasing the size of the chambers and wall thickness or wall stiffness required to produce a final size chamber which is of the right size after insertion of the conduit liner assembly in the conduit 12. Thus, the conduit liner assembly of the present invention increases the value of a particular conduit because a larger number of chambers can be provided because of the reduction in the tendency of the inserts to go oval and subsequent reduction in size of the chambers of the inserts necessary to obtain a particular chamber dimension after the conduit liner assembly is routed through a conduit.

Thus in operation after insertion of the conduit liner assembly 10 in a conduit 12 is completed a fiber optics element or cable 36 (FIG. 10) can be routed through the chambers of each of the inserts. In practice it has been found desirable that fiber optics elements or cables 36 are initially routed through the outer periphery of inserts (14 in FIG. 1) leaving the central insert 16 the last to be filled.

In a further embodiment of the present invention it is preferable that each of the inserts be coded for identification of a particular insert or fiber optics cable. This may be accomplished in any number of ways, however in a preferred embodiment the inserts are individually color coded for instance each individual liner may be manufactured out of different colored plastics material allowing identifications of the individual liners in a particular liner assembly. Thus an individual insert could be readily identified at both the inlet and outlet ends.

A further advantage of the present invention is found in that the conduit liner assembly of the present invention may be assembled in the final bundled assembly at the installation site at the point of insertion of the assembly into an existing conduit. This allows the individual inserts to be contained on separate reels and brought to the site on the separate reels. This allows a greater continuous length and less splicing of the conduit liner assembly than if the conduit liner assembly was wound around a reel in its assembled condition, or was of a single multiple chamber design.

Preferably the individual inserts of the conduit liner assembly are loosely held together in the bundled arrangement to more easily facilitate the desirable longitudinal movement between the inserts particularly around curves or bends in the conduit. The amount of looseness will vary and may be adjusted according to the particular embodiment of the invention and depending on the particular final application. For instance, if it is known that a particular length of conduit is generally straight it may be desirable to have a more tightly held bundle of individual inserts. If a conduit is known to have a particularly curved nature it may be desirable to have a conduit liner assembly wherein the individual inserts are more loosely held in bundled engagement to facilitate easier longitudinal movement of the individual inserts one to another along the curved path of the conduit.

Also provided in the present invention is a method for installation of a conduit liner assembly in an existing conduit providing a liner for use in retaining a plurality of fiber optics cables in discreet and separate chambers in the conduit. The method comprises the steps of first connecting a group of separate tubular inserts together into a loosely held bundle wherein the separate tubular inserts are longitudinally moveable with respect to one another when in the condition. The bundle of inserts is pulled through an existing conduit by means of a cable and winch assembly or other means at a suitable access point in the conduit such as a manhole. If desired, the bundle is separated into individual tubular inserts at the access point for purposes of pulling each insert separately prior to reassembly for pulling through the next length of conduit. For instance, the individual tubular inserts may be wound around a drive unit such as a capstan drive device and then pulling forces applied in unison by the capstan drive device, thereby separating the pulling forces through each insert and providing a improved method whereby the insert can be pulled through longer distances and thus reducing the man hours and access points necessary to install such a conduit liner.

The invention has been described in an illustrative manner and it is to be understood that the terminology which has been used has been intended to be that of description rather than that of limitation.

Obviously many modifications and variations of the present invention are possible in light of the above teaching. It is therefore to be understood that within the scope of appended claim the invention may be practiced otherwise than as specifically described.

What is claimed is:

1. A conduit liner assembly adapted for insertion into a conduit for retaining a plurality of fiber optics elements in discreet and separate chambers in the conduit comprising:

a plurality of individual inserts each having at least one fiber optic element receiving chamber; and connection means for causing said inserts to be held in bundled engagement one to another, said bundled inserts adapted to move through a conduit having curvatures or bends during insertion and said connection means enabling each of said inserts in said bundled engagement to individually move longitudinally with respect to each of said inserts adjacent thereto such that each of said inserts may move independently of the other inserts as the conduit liner assembly is inserted through the curvatures or bends of the conduit.

2. The conduit liner assembly of claim 1 further comprising an outer periphery of inserts surrounding a center insert wherein said outer periphery and center inserts are longitudinally movable with respect to one another and said center insert is longitudinally movable in relation to said outer periphery of inserts and is entrapped by said outer periphery of inserts.

3. The conduit liner assembly of claim 2 wherein said connection means further comprises an outer periphery of interconnected inserts each including a male connection portion and a female connection portion extending axially along the length thereof whereby the male connection portion of each of said inserts is connected with a female connection portion of an adjacent one of said inserts forming an interconnected ring of said inserts for surrounding said central insert.

4. The conduit liner assembly of claim 3 wherein said male connection portion includes a first series of outwardly extending slots spaced along the axial length thereof and said female connection portion includes a second series of outwardly extending slots spaced along the axial length thereof.

5. The conduit liner assembly of claim 4 wherein said first series of slots are staggered from said second series of slots whereby said slots are adapted to remain disaligned during longitudinal movement between adjacent inserts, said slots providing flexibility of said inserts.

6. The conduit liner assembly of claim 5 wherein said first series of slots and said second series of slots are disposed at opposite oriented angles to a central axis of said inserts opposite to one another.

7. The conduit liner assembly of claim 5 wherein said first and second series of slots are disposed at opposite oriented angles to a central axis of said inserts, and each of said opposite angles are further defined as being an angle other than 90 degrees.

8. The conduit liner assembly of claim 2 wherein said inserts are flexible tubular members.

9. The conduit liner assembly of claim 8 wherein said chamber of said central insert has a diameter greater than the diameter of said inserts forming said outer periphery.

10. The conduit liner assembly of claim 9 wherein at least one of said inserts in said outer periphery of inserts has a diameter which is different from the other inserts in said outer periphery.

11. The conduit liner assembly of claim 1 further comprising:

said connection means including a central chambered insert having a plurality of radially extending retention protrusions and one or more outer chambered inserts having cooperating retention portions, said cooperating retention portions acting in cooperation with said retention protrusions for providing longitudinally slidable connection between said one or more outer chambered inserts and said central chambered insert.

12. The conduit liner assembly of claim 11 wherein said plurality of radially extending retention protrusions are male protrusions along the axial length thereof, said male protrusions having a central axis rib with an outer peripheral edge and extending radially outwardly and including a pair of locking edges each having a free end portion axially inward of said peripheral edge;

said cooperating retention portions including a pair of cordal edge portions extending cordally outwardly from each of said one or more outer chambered inserts for longitudinally slidable engagement between adjacent free end portions of a pair of said male protrusions for retaining said one or more outer chambered inserts substantially engaged against radially outward movement between said central chambered insert and said one or more outer chambered inserts and allowing longitudinal movement between said central and said one or more outer chambered inserts.

13. The conduit liner assembly of claim 11 wherein said central chambered insert and said one or more outer chambered inserts are tubular and have a circular cross-section.

14. The conduit liner assembly of claim 13 wherein the diameter of said central chambered insert is greater than the diameter of said one or more outer chambered inserts.

15. The conduit liner assembly of claim 13 wherein at least one of said inserts in said one or more outer periphery of inserts has a diameter which is of a different dimension than the others of said one or more outer chambered inserts.

16. The conduit liner assembly of claim 1 further comprising:
   a fiber optics element for insertion into said central chamber;
   and said central chamber includes a plurality of axial ribs extending radially inward along the axial length thereof, said axial ribs providing a bearing surface for reducing friction between said chamber and a fiber optics element upon insertion of said fiber optics element into said chamber.

17. The conduit liner assembly of claim 16 further comprising a central tubular member and an outer periphery of tubular members wherein said central tubular member comprises a plurality of said rib portions for defining a series of open chambers for assisting of positioning of said outer periphery, for symmetrical location of said outer periphery of tubular members and for retention of said members in a circumferential configuration which is substantially symmetrical about said central tubular member in said bundled configuration.

18. The conduit liner assembly of claim 17 wherein said chamber is generally cylindrical and has axial ribs protruding radially inwardly and along the axial length thereof, said bundle of fiber optics strands being insertable into said chamber, said axial ribs providing a bearing surface for reducing friction between said chambered insert and said fiber optics strands during insertion of said fiber optic strands into said chamber.

19. A conduit liner assembly adapted for use in retaining a plurality of fiber optics cables in discreet and separate chambers in a conduit comprising:
   a plurality of flexible tubular members;
   a wrapping member for wrapping around said plurality of tubular members to produce a bundle of said tubular members; and
   said wrapping of said bundle being accomplished such that said tubular members are held in bundled engagement when moving through a conduit having curvatures or bends during insertion and each of said flexible tubular members is freely movable in a longitudinal direction with respect to each of the adjacent flexible tubular members such that each of said flexible tubular members may move independently of the other flexible tubular members as the conduit liner assembly is inserted through the curvatures or bends of the conduit.

20. The conduit liner assembly of claim 19 wherein said flexible tubular members further include an axial ribbed portion running along said tubular members and on the outer periphery thereof, said axial rib portion defining a bearing surface for reducing frictional forces between said conduit and said flexible tubular members when said assembly is positioned in said conduit.

* * * * *